(12) United States Patent
Ogden et al.

(10) Patent No.: US 7,989,413 B2
(45) Date of Patent: Aug. 2, 2011

(54) DRYER SHEET

(76) Inventors: J. Michael Ogden, Cincinnati, OH (US); Arthur V. Shannon, III, Hopewell, NJ (US)

( * ) Notice: Subject to any disclaimer, the term of this patent is extended or adjusted under 35 U.S.C. 154(b) by 601 days.

(21) Appl. No.: 11/422,889

(22) Filed: Jun. 8, 2006

(65) Prior Publication Data

US 2007/0015676 A1 Jan. 18, 2007
US 2008/0214423 A9 Sep. 4, 2008

Related U.S. Application Data

(63) Continuation-in-part of application No. 10/826,975, filed on Apr. 16, 2004, now abandoned, which is a continuation-in-part of application No. 10/119,343, filed on Apr. 8, 2002, now abandoned.

(51) Int. Cl.
*C11D 17/00* (2006.01)
(52) U.S. Cl. ...................................................... 510/527
(58) Field of Classification Search .................... 510/527
See application file for complete search history.

(56) References Cited

U.S. PATENT DOCUMENTS

| | | | |
|---|---|---|---|
| 4,049,858 A | 9/1977 | Murphy | |
| 4,105,813 A | 8/1978 | Mizuno | |
| 4,550,676 A | 11/1985 | Francis | |
| 5,238,587 A | 8/1993 | Smith et al. | |
| 5,470,492 A | 11/1995 | Childs et al. | |
| 5,480,567 A | 1/1996 | Lam et al. | |
| 5,547,476 A | 8/1996 | Siklosi et al. | |
| 5,658,651 A | 8/1997 | Smith et al. | |
| 5,681,355 A | 10/1997 | Davis et al. | |
| 5,716,918 A | 2/1998 | Sivik et al. | |
| 5,746,776 A | 5/1998 | Smith et al. | |
| 5,869,410 A | 2/1999 | Smith et al. | |
| 5,880,076 A | 3/1999 | Vermeer | |
| 5,929,026 A | 7/1999 | Childs et al. | |
| 5,972,041 A | 10/1999 | Smith et al. | |
| 5,997,586 A | 12/1999 | Smith et al. | |
| 6,036,727 A | 3/2000 | Smith | |
| 6,056,873 A * | 5/2000 | Hartley et al. ................... | 210/90 |
| 6,086,634 A | 7/2000 | Smith | |
| 6,107,270 A | 8/2000 | Smith et al. | |
| 6,132,474 A | 10/2000 | Smith et al. | |
| 6,133,226 A | 10/2000 | Knowlton et al. | |
| 6,169,067 B1 | 1/2001 | Childs et al. | |
| 6,179,880 B1 | 1/2001 | Smith | |
| 6,238,736 B1 | 5/2001 | Smith et al. | |
| 6,254,932 B1 | 7/2001 | Smith et al. | |
| 6,277,810 B2 | 8/2001 | Baines et al. | |
| 6,315,800 B1 | 11/2001 | Gomes et al. | |
| 6,316,402 B1 | 11/2001 | Baker et al. | |
| 6,323,172 B1 | 11/2001 | Trinh et al. | |
| 6,335,315 B1 | 1/2002 | Trinh et al. | |
| 6,352,969 B2 | 3/2002 | Hsu et al. | |
| 6,609,311 B2 | 8/2003 | Hagemann et al. | |
| 6,787,510 B2 | 9/2004 | Santos et al. | |
| 6,887,841 B2 | 5/2005 | Mattia et al. | |
| 6,916,777 B2 | 7/2005 | Connor et al. | |
| 6,949,502 B2 | 9/2005 | Trinh et al. | |
| 6,998,380 B2 | 2/2006 | Fry et al. | |
| 7,001,879 B2 | 2/2006 | Levinson | |
| 7,018,976 B2 * | 3/2006 | Murphy et al. ................ | 510/520 |
| 7,071,157 B2 | 7/2006 | Santos et al. | |
| 7,087,572 B2 | 8/2006 | Hubig et al. | |
| 2002/0062574 A1 | 5/2002 | Volpenhein et al. | |
| 2003/0195130 A1 | 10/2003 | Lentsch et al. | |
| 2003/0224962 A1 | 12/2003 | Fryc | |
| 2004/0092192 A1 | 5/2004 | Willis | |
| 2005/0020475 A1 | 1/2005 | Ogden et al. | |
| 2005/0066542 A1 | 3/2005 | Griffiths et al. | |

FOREIGN PATENT DOCUMENTS

| | | |
|---|---|---|
| EP | 459822 A2 * | 12/1991 |
| WO | 01/61100 A2 | 8/2001 |
| WO | 01/61100 A3 | 8/2001 |
| WO | 02/12423 A2 | 2/2002 |
| WO | 03/087465 A1 | 10/2003 |
| WO | WO 2004/146555 A1 * | 12/2008 |

OTHER PUBLICATIONS

Cognis Product Literature from Google search of "Plantatex HCC". Jul. 2008.*
Pearl Higginbotham and Mary Ellen Pinkham, Mary Ellen's Best of helpful hints 89 (1979).*

* cited by examiner

*Primary Examiner* — John R Hardee
(74) *Attorney, Agent, or Firm* — GrayRobinson, P.A.

(57) ABSTRACT

A dryer sheet is provided comprising a liquid fabric treating composition having at least one active ingredient which is retained in liquid form within a substrate, preferably a sheet of non-woven material. The dryer sheet is introduced into a rotary clothes dryer with laundered, damp clothing where an effective amount of the active ingredient is transferred into the fabric of the articles of clothing during a drying cycle as a result of contact of the liquid fabric treating composition with water contained within the damp clothing.

32 Claims, No Drawings

DRYER SHEET

RELATED APPLICATIONS

This application is a continuation-in-part of U.S. patent application Ser. No. 10/826,975, filed Apr. 16, 2004, which is a continuation-in-part of U.S. patent application Ser. No. 10/119,343, filed Apr. 8, 2002, now abandoned.

FIELD OF THE INVENTION

This invention relates to a dryer sheet for use in a rotary clothes dryer, and, more particularly, to a liquid fabric treating composition having at least one active ingredient which is present in liquid form on a substrate and is transferred during the course of a drying cycle to damp clothing within a clothes dryer as a result of contact of the composition with water contained within the damp clothing.

BACKGROUND OF THE INVENTION

Fabric treating compositions have been developed which are capable of imparting one or more of a variety of properties to articles of clothing, such as softness, fragrance, brightening, bodying, reduced static, anti-soiling, anti-creasing and others. Two of the most prominent commercially available methods of treating clothing include liquid fabric softeners employed in washing machines, and "dry" dryer sheets used in clothes dryers.

One liquid fabric softener is commercially available from The Proctor & Gamble Company of Cincinnati, Ohio under the trademark Downy®. Liquid fabric softeners of this general type are comprised of cationic compounds, and particularly quaternary ammonium and imidazolinium salts, in the form of liquid emulsions. They are introduced into the washing machine and added to the clothing during the rinse cycle.

Although effective in imparting softness and reducing static cling, liquid fabric softeners have a number of deficiencies. One limitation is that they are inconvenient to use. Often sold in relatively large and heavy containers, liquid fabric softeners must be poured into the relatively small cap of the container, a cup or other measuring device to obtain the proper quantity for a particular size load of wash. The liquid softener is then poured into a receptacle in the washing machine where it is held until the rinse cycle begins. It is easy to spill the liquid softener, both when measuring and pouring it into the washing machine, and then one needs to clean the cap or other measuring device after use.

Another problem with liquid fabric softeners is that the entire content of the washing machine is subjected to the softening agent when it is applied in this fashion. It may be desirable to soften only some of the clothes being washed in a particular washing cycle, but in order to do that the clothing must be separated beforehand and additional loads of wash run. This is not only inefficient but uses additional energy and water.

A still further deficiency of liquid fabric softeners is their effect on the flammability of clothing items. According to tests conducted by *Consumer Reports*, liquid fabric softener added to the rinse water in washing machines accelerates the burn rate of most fabrics tested. For example, in one test, a terry-cloth bathrobe laundered with liquid fabric softener took just 1.9 seconds to burn a five inch path whereas the same fabric without the fabric softener took 13 seconds to burn the same five inch path. Although the rate of burn varies with the type of fabric, seconds count when clothing catches fire.

With respect to "dry dryer sheets," one product of this type is commercially available from The Proctor & Gamble Company of Cincinnati, Ohio under the trademark Bounce®. Dryer sheets of this type generally comprise sheets of non-woven material impregnated with a composition usually consisting of a cationic softening agent, antistatic agents, dispersing agents and a fragrance. The softening or other fabric treating agent is applied to the non-woven material and then dried in an oven so that it is completely "dry" when ready for use. One or more dry dryer sheets are placed into a rotary clothes dryer with freshly laundered, damp items of clothing, where they remain for the entire drying cycle. The composition on the sheet of non-woven material is released in the course of the drying cycle as a result of the heat within the clothes dryer, and contact with the clothing induced by the tumbling action of the dryer.

Although much more convenient to use than liquid fabric softeners, the dry dryer sheets described above also have a number of limitations. First, dry dryer sheets exhibit relatively poor softening capability compared to liquid fabric softeners. One reason for this is that dry dryer sheets depend to a large extent on physical contact with the clothing within the dryer during the drying cycle in order to effectively transfer the softening composition to the clothes. If the dryer sheet becomes trapped within the sleeve of a shirt, a pant leg or the like, it cannot make contact with other articles of clothing within the dryer. Even if the dry dryer sheet freely contacts the clothing during a drying cycle, the softening agent it carries does not penetrate the fabric to the same extent as liquid fabric softener in the rinse cycle of the washing machine.

Another limitation of dry dryer sheets is that a relatively high temperature is required in order to activate the softening or other fabric treating agent on the non-woven sheet and release it into the fabric of the clothing. Most clothes dryers have several heat settings to accommodate different types of clothing. For example, delicate fabrics are preferably dried at lower heat settings and temperatures than clothing made from cotton or the like. At lower heat settings, dry dryer sheets are of marginal effectiveness and therefore delicate fabrics or other clothing dried at lower temperatures may not exhibit the desired softness and feel when worn. This is a pervasive problem in many European countries, as well as other countries around the world, where the high cost of energy makes it a necessity to operate clothes dryers at lower temperatures. On the other hand, it has been observed that clothing dried at high heat settings and temperatures often exhibit an increased amount of static cling and wrinkling. This is true even when the dry dryer sheet is provided with anti-static agents. Furthermore, in addition to creating static cling and wrinkling, high drying temperatures are hard on fabrics, tending to break them down over time.

SUMMARY OF THE INVENTION

A dryer sheet is provided comprising a liquid fabric treating composition, having at least one active ingredient, which is retained in liquid form on a substrate, preferably a sheet of non-woven material. The dryer sheet is introduced into a rotary clothes dryer with laundered, damp clothing where an effective amount of the active ingredient is transferred into the fabric of the articles of clothing during a drying cycle as a result of contact of the composition with the water contained within the damp clothing.

This invention is predicated on the concept of using the presence of water within the damp clothing placed in a rotary clothes dryer after washing to achieve the transfer of at least one active ingredient contained in a liquid fabric treating composition from a substrate carrying the composition to the clothing. The components of the liquid fabric treating composition are preferably combined at ambient temperature, without the addition of heat, and may be applied onto the substrate, preferably a sheet of non-woven material, and released from the substrate, without the addition of heat. The non-woven material forming the substrate is specifically chosen for its ability to retain the liquid fabric treating composition in liquid form thereon, and to permit the transfer of such composition to the damp clothing within the clothes dryer during a drying cycle.

A wide variety of active ingredients may be employed in the liquid fabric treating composition of this invention, depending upon the particular property or properties to be imparted to the clothing. Such active ingredients may include, without limitation, anti-creasing agents, anti-soil agents, bacteriostatic agents, brightening agents, bodying agents, softening agents, dyes, fiber emollients, finishing agents, fragrances, insect repellants, germicides, lubricants, mildew-proofing agents, moth-proofing agents, shrinkage controllers and sizing agents. Additives and auxiliaries may also be included in the composition, such as preservatives, anti-static agents, fragrances and others.

A number of important advantages are obtained with the dryer sheet of this invention compared to the prior art. Unlike liquid softening compositions introduced into the washing machine, the dryer sheet of this invention is extremely easy and convenient to use—no measuring, no spilling, no heavy container to pour from, no clean up of a measuring cap or cup and no need to separate clothing before washing according to what items are to be softened or not. Further, the fabric treating composition employed in the present invention does not increase the flammability of fabric, which is of particular concern with many liquid fabric softeners currently offered on the market.

Other advantages of the present invention highlight the deficiencies of "dry" dryer sheets described above. The liquid fabric treating composition employed in the present invention is transferred into the fabric of clothing within a clothes dryer operated at ambient temperature, or at any heat setting. Unlike dry dryer sheets which are activated only at high temperatures, the liquid fabric treating composition of the present invention is transferred to articles of clothing within the dryer as a result of contact of the composition with the water container in the damp clothing. As discussed in more detail below, such transfer occurs before the articles of clothing are heated and lose their water content.

DETAILED DESCRIPTION OF THE INVENTION

The dryer sheet of this invention comprises the combination of a liquid fabric treating composition having at least one active ingredient and a substrate capable of retaining the composition in liquid form and permitting the transfer of the composition to damp articles of clothing within a clothes dryer during a drying cycle. For purposes of the present discussion, the term "active ingredient" refers to a wide variety of components which, when applied to an article of clothing, are capable of imparting a particular property or characteristic to an article of clothing within a clothes dryer during the course of a drying cycle. The term "active ingredient" also is intended to encompass components which may be applied to a substrate within the clothes dryer during the course of a drying cycle, and then imparted to the skin of a wearer of the clothing. The term "article of clothing" is intended to be broadly construed as applying to essentially any item which is commonly dried in a clothes dryer, including, without limitation, clothing, sheets, towels, rugs and other items made of fabric. Additionally, the term "clothes dryer" or "rotary clothes dryer" refers to a rotary hot air dryer which includes a rotating drum within which articles to be dried are subjected to a flow of heated air, typically at a temperature of about 40° C. to 90° C. Each component of the dryer sheet of this invention is described separately below, followed by a discussion of the operation of the dryer sheet and illustrative examples.

Liquid Fabric Treating Composition

The liquid fabric treating composition of this invention generally comprises a carrier and one or more active ingredients each capable of imparting a particular property or characteristic to an article of clothing within a clothes dryer during the course of a drying cycle. Such active ingredients may include, without limitation, anti-creasing agents, anti-soil agents, anti-static agents, bacteriostatic agents, brightening agents, bodying agents, softening agents, dyes, fiber emollients, finishing agents, fragrances, insect repellants, germicides, lubricants, mildew-proofing agents, moth-proofing agents, shrinkage controllers and sizing agents.

In the presently preferred embodiment, the carrier is water. The active ingredients noted above may include different classes of compounds, as is well known to those of ordinary skill in the art, but each compound selected for the liquid fabric treating composition of this invention may be added to the carrier to form a solution, dispersion or emulsion at ambient temperatures, without the addition of heat.

One particular type of active ingredient suitable for use in the liquid fabric treating composition of this invention may comprise a single material or a mixture of materials which are known to provide benefits to the skin. As discussed below, the liquid fabric treating composition is applied and retained in liquid form on a substrate and transferred from the substrate to articles of clothing within a clothes dryer during the course of a drying cycle. Clothing which receives a skin-treating active ingredient from the dryer sheet of this invention during a drying cycle within a clothes dryer subsequently transfers it to the skin when the clothing is worn by an individual.

The skin-treating active ingredient can comprise essentially any known component for treating human skin, such as insect repellants, UV absorbers, skin moisturizers, tanning agents, wrinkle removers, deodorants, cellulite reducers, vitamins, anti-oxidants, minerals, lipid layer enhancers, hair growth suppressants, emollients, botanical actives and the like. The skin treating active ingredient can be derived from a broad range of classes of materials such as emollients, lubricants, super-fatting agents, natural extracts which provide benefits to the skin depending upon the nature of the natural extracts, the lees from wine-making, DNA derivatives, hydrolyzed proteins both of animal and vegetable origin, derivatives of the hydrolyzed proteins, plant extracts, the skin-active portions of plant extracts and the like.

One particular skin-treating active ingredient suitable for use in the liquid fabric treating composition of this invention is commercially available under the trademark PLANTATEX™ HCC owned by Cognis Deutchland GmbH & Co. This ingredient is a wax dispersion with glyceryl esters, an emulsifier and water. It contains skin treating components such as glycerol oleate, which is a lipid layer enhancer.

Although not required, an emulsifier may be added to the liquid fabric treating composition when using PLANTATEX HCC and similar skin-treating active ingredients to promote transfer of the composition to the substrate, described below. It is believed that the additional emulsifier adds softness to the articles of clothing without decreasing the water-absorbency, which typically occurs with "dry" dryer sheets of the type described above in connection with a discussion of the prior art. Suitable emulsifiers and co-emulsifiers are nonionic, anionic, cationic or amphoteric emulsifiers, zwitterionic surfactants and esterquats, all of which are well known in the art.

The liquid fabric treating composition may further include one or more additives and auxiliaries to provide known benefits to the treated articles of clothing such as anti-static properties, a pleasing aroma, improved shelf life and the like. For example, preservatives such as formaldehyde, parabens, pentanediol, sorbic acid and other classes of compounds may be added, as is well known in the art. A number of different fragrances can be employed in the composition to create the desired smell of the clothing; including, without limitation, rose oil, lavender, lilac, jasmine, vanilla, wisteria, lemon, apple blossom or compound bouquets such as citrus, spice, aldehydic, woods, oriental, baby powder and others.

When employing a skin-treating active ingredient in the composition of this invention, such as PLANTATEX HCC, the liquid fabric treating composition comprises from 5% by weight to 95% by weight of the skin-treating active ingredient; from 0.1% by weight to 40% by weight of at least one emulsifier; from 0% by weight to 35% by weight of auxiliaries and additives; from 0% by weight to 95% by weight of a carrier; preferably, from 10% by weight to 75% by weight of the skin-treating active ingredient; from 0.5% by weight to 30% by weight of at least one emulsifier; from 20% by weight of auxiliaries and additives; and most preferably, from about 15% by weight to about 50% by weight of the skin-treating active ingredient; from about 5% by weight to about 20% by weight of at least one emulsifier; from about 35% by weight to about 75% by weight of a carrier; and from about 10% by weight to about 20% by weight of auxiliaries and additives.

As noted above, the carrier is usually water but can be other liquid components which provide a vehicle for impregnating the substrate with the skin-treating active ingredient and the emulsifier. The carrier can be one of the components of the skin-treating active ingredient or the emulsifier or mixture of emulsifiers which can provide a mixture which is liquid at ambient temperature and has a viscosity allowing application of the composition onto the substrate.

Substrate

The liquid fabric treating composition is applied by spraying, dipping or other suitable method to a substrate having at least two characteristics needed to allow the dryer sheet of this invention to successfully transfer an effective amount of the active ingredient(s) of the composition to articles of clothing within a clothes dryer in the course of a drying cycle. One requirement of the substrate is that it receive and maintain the fabric treating composition in liquid form, i.e. from the time the composition is applied to the substrate until it is placed in the clothes dryer with damp clothing from a washing machine. Secondly, the substrate must permit the transfer of liquid fabric treating composition to the damp clothing during the course of a drying cycle in the clothes dryer.

In the presently preferred embodiment, the substrate is formed of a sheet of non-woven material, although it is contemplated that other materials capable of performing the two functions noted above could be utilized including woven material, foam material, especially open cell foam material, sponge and similar materials. Non-woven material is particularly suited to the present application due to its relatively low cost, ease of processing, biodegradation capability and ability to absorb moisture. It is typically formed of natural fibers such as cellulosic, plant-based, polylatic acid material etc., or synthetic fibers such as polyester, nylon, polypropylene, polytrimethylene terephthalate and polyethylene terephthalate, or, blends of such natural and synthetic fibers. The fibers are formed in a sheet, typically by hydro-entanglement or needle-entanglement.

Without wishing to be limited by any particular theory of operation of the dryer sheet of this invention, it is believed that the dryer sheet operates as follows. The fabric treating composition is maintained in liquid form on the substrate, e.g. a sheet of non-woven material typically having a width and length each in the range of about 6-8 inches. It is believed that the active ingredient(s) within the liquid fabric treating composition is transferred to the clothes within the dryer as a result of contact of the composition with the water held within the damp clothing in the dryer. No precise volumetric measurement can be given for the amount of water contained within freshly laundered articles of clothing due to variations in the efficiency of the spin cycle of different washing machines and the degree of water retention of clothing articles made from different materials (cotton, synthetics etc), but freshly laundered articles of clothing nevertheless contain some amount of water when placed in a clothes dryer, and for purposes of the present discussion are characterized as "damp." The liquid fabric treating composition migrates or transfers to the damp clothing, moving throughout the water held in the clothing, and transfers from one article or clothing to another as the dryer sheet and clothing contact one another while being tumbled together within the rotary clothes dryer. It is believed that the dryer sheet need not make contact with the water contained in each individual article of clothing, but that it need only contact at least some of the articles to transfer the composition thereon. Once some articles of clothing receive the fabric treating composition, they transfer it to other articles by contact with the water in such other articles.

As noted above, no heat is employed to combine the components which make up the liquid fabric treating composition of this invention. Moreover, unlike conventional "dry" dryer sheets such as Bounce®, no heat is required for the transfer of such composition from the non-woven sheet to the damp clothing in the clothes dryer. In fact, the dryer sheet of this invention is ineffective if the articles of clothing in the dryer do not contain water. It is believed that the transfer of the liquid fabric treating composition to the article of clothing within the dryer occurs during the early stages of the drying cycle when the clothing has its greatest water content and has not yet been heated to a temperature necessary to remove the water. When the clothing and the interior of the dryer reaches higher temperature, later in the drying cycle, the water content of the clothing is reduced. That is when "dry" dryer sheets begin to function, i.e. the fabric treating composition placed on such dry dryer sheets melts and is transferred by physical contact with the heated clothing in the dryer. Such a transfer process is inefficient and ineffective compared to the dryer sheet of the present invention.

It has been found that only certain configurations and types of non-woven material are suitable for use in the present invention, i.e. have the dual capability of retaining the fabric treating composition in liquid form thereon, and then releasing the composition so that it may be transferred to the damp clothing within the clothes dryer during a drying cycle. Most natural fibers have been found to readily absorb the fabric treating composition, and maintain it in liquid form thereon, but certain non-woven sheets made from such fibers fail to transfer the liquid composition to the damp clothing in the dryer. In the case of certain natural fibers, the liquid fabric treating composition is absorbed and retained in the fibers with little or no migration or transfer of the composition being permitted upon contact with the damp clothing in the dryer. Synthetic fibers, on the other hand, are generally adsorbent in nature. The liquid fabric treating composition may be captured between adjacent fibers within a hydro-entangled or needle-entangled non-woven sheet without being absorbed into the fibers. As a result, the composition may be readily transferred to the damp articles of clothing in the dryer as a result of contact with the water in such articles. However, it has been found that non-woven sheets made from solely or predominantly synthetic fibers which are impregnated with the liquid fabric treating composition have an unacceptable "slimy" or slick feel when handled, and the composition readily transfer to the hands when placing the dryer sheet into the clothes dryer.

It has been found that a non-woven sheet made solely of natural fibers, or a blend of natural fibers and synthetic fibers, and having apertures throughout the length and width of the sheet, satisfies the dual requirements noted above. The term "aperture" refers to holes in the non-woven sheet which are visible to the naked eye. In a presently preferred embodiment of this invention, the apertures are arranged in substantially uniform columns and rows throughout the length and width of the non-woven sheet. The number of apertures, and, hence, their relative size, ranges from about 6 holes by 6 holes to about 12 holes by 12 holes, per square inch. In other words, at one extreme there are about 6 holes extending in one direction (Y axis) and 6 holes extending in a perpendicular direction (X axis) for a total of about 36 holes per square inch. At the other extreme, the non-woven sheet has 12 holes extending in one direction (Y axis) and 12 holes extending in a perpendicular direction (X axis) for a total of about 144 holes per square inch. The fibers of the non-woven material extending between the holes in the sheet are impregnated with the liquid fabric treating composition and retain it in liquid form thereon. The presence of the holes in the sheet substantially increases the surface area of the fibers which is exposed and may come into contact with the damp clothing in the dryer. Not only are the opposite sides of the sheet exposed, but the area of the fibers extending along the holes in the sheet is exposed, e.g. the area along the thickness of the non-woven sheet. As a result, the liquid fabric treating composition is much more readily released from an apertured non-woven sheet and transferred to articles of clothing within the dryer due to contact with the water contained in the clothing.

One presently preferred non-woven material is fabricated from fibers sold under the "Tencel" trademark which are commercially available from Courtaulds Fibers, Inc. of Axis, Ala. Tencel fibers are manufactured from a solvent spinning process in which wood pulp and amine oxide solution are mixed and heated until the cellulose dissolves. The resulting solution is then extruded into a dilute aqueous solution of the amine oxide, which precipitates the cellulose as fibers. The Tencel fibers exhibit a dry tensile strength in excess of other man-made cellulosic fibers and many synthetics, and have a tensile strength when wet of about 85% of its dry tensile strength. Such fibers absorb liquid up to about 800% of their dry weight, and therefore provide a highly liquid absorbent substrate when hydroentangled to form a non-woven sheet.

The non-woven sheet of this invention may be formed of Tencel or other natural fibers such as rayon, cellulosic and polylatic acid material, or a blend of such fibers and synthetic fibers such as polyester, nylon, polypropylene, polytrimethylene terephthalate, polyethylene terephthalate. The content of fibers in the non-woven sheet may range from about 70% natural fibers and 30% synthetic fibers, to about 30% natural fibers and 70% synthetic fibers. One presently preferred blend of fibers forming the non-woven sheet of this invention is 70% Tencel fibers and 30% polyester, which is commercially available as a fine apertured, spun laced non-woven sheet (12 holes by 12 holes configuration) from Ahlstrom Green Bay, Inc. under model number SX-156.

It is noted that the substrate employed in the dryer sheet of this invention has been characterized throughout as being capable of retaining the fabric treating composition in "liquid form" thereon. The term "liquid form" in the context of the present invention refers to the generally understood state of a fluid in which the fluid has a definite volume without a definite shape except that temporarily given by a container or the like. "Liquid form" does not mean a gel or gelled, or the state of a substance in which it is not flowable. The fabric treating composition of the present invention is applied and retained in "liquid form" within the substrate in the sense that it has a definite volume, assumes the shape of the substrate and can be transferred to the damp articles of clothing within a clothes dryer during the course of a drying cycle as a result of contact with the water contained in such articles of clothing.

The present invention will be better understood from the examples which follow, all of which are intended for illustrative purposes only and are not meant to unduly limit the scope of the invention in any way.

Example I

A skin-treating composition was prepared containing:

|  | % wt |
|---|---|
| Water | 49.4 |
| PLANTATEX HCC | 50.0 |
| KATHON CG-ICP | 0.05 |
| Fragrance* | 0.5 |

*Givaudin UM 046904/00 floral fruity fragrance

Charge a mixing vessel with water. Add PLANTATEX® HCC with moderate agitation. After the mixture is uniform, add KATHON CG-ICP and fragrance. KATHON CG-ICP is a preservative commercially available from Cognis Deutchland GmbH & Co. Continue mild agitation to prevent finished batch from separating. Separation will occur within a few hours after agitation is stopped. The mixture was applied to a non-woven substrate (SX285 from Greenbay Nonwovens) at a weight ratio of about 1:6.5 (substrate: fabric treating composition). Both the mixing of components and application of the mixture onto a non-woven substrate are performed at room temperature.

Example II

A skin-treating composition was prepared containing:

|  | % wt |
|---|---|
| Water | 45.45 |
| PLANTATEX HCC | 50.0 |
| DEHYQUART A-C4 | 4.0 |
| KATHON CG-ICP | 0.05 |
| Fragrance* | 0.5 |

*Givaudin UM 046904/00 floral fruity fragrance

Charge a mixing vessel with water. Add PLANTATEX HCC and then DEHYQUART A-C4 with moderate agitation. DEHYQUART A-C4 is commercially available from Cognis Deutchland GmbH & Co. The mixture was applied to a non-woven substrate (SX285 from Greenbay Nonwovens) at a weight of about 1:6.5 (substrate fabric treating composition). Both the mixing of components and application of the mixture onto a non-woven substrate are performed at room temperature.

Example III

A skin-treating composition was prepared containing:

|  | % wt |
| --- | --- |
| PLANTATEX HCC | 93.95 |
| DEHYQUART A-C4 | 4 |
| KATHON CG-ICP | 0.05 |
| Fragrance* | 2.0 |

*Givaudin UM 046904/00 floral fruity fragrance

Charge a mixing vessel with PLANTATEX HCC, and then add DEHYQUART A-C4, KATHON CG-ICP and the fragrance with moderate agitation. The mixture was applied to a non-woven substrate (SX-156 from Ahlstrom Green Bay, Inc. of Green Bay, Wis.) at a loading of 4 grams per sheet. The sheet size was 7 inches by 8 inches. Both the mixing of components and application of the mixture onto a non-woven substrate are performed at room temperature.

While Example III indicates that the non-woven sheet was given a loading of 4 grams of the liquid fabric treating composition, it is contemplated that loadings in the range of 2 grams to 4 grams would provide a suitable quantity of composition for transfer to clothing within a dryer. Such loading is independent of the size of the non-woven sheet, i.e., the sheet may be 5 inches by 5 inches, 8 inches by 8 inches or some other dimensions, and each would receive the same amount of liquid fabric treating composition, by weight. Additionally, while the percentage of fragrance indicated in Example III is 2% by weight, it is contemplated that the fragrance could be added to the mixture in quantities in the range of about 0.5% to 4% by weight, while changing the percentage of PLANTATEX HCC accordingly. Further, the amount of DEHYQUART A-C4, or similar agent, may be varied in the range of about 4% to 10% by weight, while changing the percentage of PLANTATEX HCC accordingly.

The foregoing examples illustrate a preferred embodiment of the present invention, but it should be understood by those skilled in the art that various changes may be made and equivalents substituted for elements thereof without departing from the scope of the invention. Therefore it is intended that the invention not be limited to the particular embodiment disclosed as the best mode contemplated for carrying out the invention, but that the invention will include all embodiments falling within the scope of the appended claims.

What is claimed is:

1. A method of treating fabric in a clothes dryer, comprising:
    (a) providing a nonwoven substrate;
    (b) providing a substantially non-ionic liquid fabric treatment composition having at least one active ingredient;
    (c) applying the liquid fabric treatment composition to the substrate, the liquid fabric treatment composition being at substantially ambient temperature when applied to the substrate;
    (d) placing damp clothing containing water into the interior of the clothes dryer;
    (e) placing the substrate into the interior of the clothes dryer, the liquid fabric treatment composition applied to the substrate being in liquid form when the substrate is placed into the interior of the clothes dryer;
    (f) tumbling the damp clothing and the substrate within the interior of the clothes dryer, the damp clothing and the substrate not being enclosed together within a bag or other container during the course of a drying cycle while the damp clothing is being dried; and
    (g) transferring an effective amount of the at least one active ingredient from the substrate substantially evenly throughout the damp clothing during the course of the drying cycle as a result of contact of the liquid fabric treatment composition carried by the substrate with the water contained within the damp clothing.

2. The method of claim 1 in which step (a) comprises providing a substrate which is a blend of absorbent and adsorbent non-woven materials.

3. The method of claim 1 in which step (b) comprises providing a substantially non-ionic liquid fabric treatment composition having at least one active ingredient chosen from the group consisting of anti-creasing agents, anti-soil agents, bacteriostatic agents, brightening agents, bodying agents, softening agents, dyes, fiber emollients, finishing agents, inset repellants, germicides, lubricants, mildew-proofing agents, moth-proofing agents, shrinkage controllers and sizing agents.

4. The method of claim 1 in which step (b) comprises providing a substantially non-ionic liquid fabric treatment composition having auxiliaries and additives chosen from the group consisting of preservatives and fragrances.

5. The method of claim 1 in which step (g) comprises transferring an effective amount of the at least one active ingredient from the substrate to the damp clothing during an initial stage of a drying cycle beginning when the damp clothing has its greatest water content.

6. The method of claim 1 in which step (g) comprises transferring an effective amount of the at least one active ingredient from the substrate to the damp clothing during the course of a drying cycle prior to heating the damp clothing to a temperature necessary to remove water from the damp clothing.

7. The method of claim 1 in which step (g) comprises transferring an effective amount of the at least one active ingredient from the substrate to the damp clothing during an initial stage of a drying cycle beginning when the damp clothing has its greatest water content and prior to heating the damp clothing to a temperature necessary to remove water from the damp clothing.

8. A method of treating fabric in a clothes dryer, comprising:
    (a) providing a nonwoven substrate;
    (b) providing a substantially non-ionic liquid fabric treatment composition having at least one active ingredient;
    (c) applying the liquid fabric treatment composition to the substrate, the substrate being at substantially ambient temperature when the liquid fabric composition is applied thereto;
    (d) placing damp clothing containing water into the interior of the clothes dryer;
    (e) placing the substrate into the interior of the clothes dryer, the liquid fabric treatment composition applied to the substrate being in liquid form when the substrate is placed into the interior of the clothes dryer;
    (f) tumbling the damp clothing and the substrate within the interior of the clothes dryer, the damp clothing and the substrate not being enclosed together within a bag or other container during the course of a drying cycle while the damp clothing is being dried; and (g) transferring an effective amount of the at least one active ingredient from the substrate substantially evenly throughout the damp clothing during the course of a drying cycle as a result of contact of the liquid fabric treatment composition carried by the substrate with the water contained within the damp clothing.

9. The method of claim 8 in which step (a) comprises providing a substrate which is a blend of absorbent and adsorbent non-woven materials.

10. The method of claim 8 in which step (b) comprises providing a substantially non-ionic liquid fabric treatment composition having at least one active ingredient chosen from the group consisting of anti-creasing agents, anti-soil agents, bacteriostatic agents, brightening agents, bodying agents, softening agents, dyes, fiber emollients, finishing agents, inset repellants, germicides, lubricants, mildew-proofing agents, moth-proofing agents, shrinkage controllers and sizing agents.

11. The method of claim 8 in which step (b) comprises providing a substantially non-ionic liquid fabric treatment composition having auxiliaries and additives, chosen from the group consisting of preservatives and fragrances.

12. The method of claim 8 in which step (g) comprises transferring an effective amount of the at least one active ingredient from the substrate to the damp clothing during an initial stage of a drying cycle beginning when the damp clothing has its greatest water content.

13. The method of claim 8 in which step (g) comprises transferring an effective amount of the at least one active ingredient from the substrate to the damp clothing during the course of a drying cycle prior to heating the damp clothing to a temperature necessary to remove water from the damp clothing.

14. The method of claim 8 in which step (g) comprises transferring an effective amount of the at least one active ingredient from the substrate to the damp clothing during an initial stage of a drying cycle beginning when the damp clothing has its greatest water content and prior to heating the damp clothing to a temperature necessary to remove water from the damp clothing.

15. A method of treating fabric in a clothes dryer, comprising:
(a) providing a nonwoven substrate;
(b) providing a substantially non-ionic liquid fabric treatment composition having at least one active ingredient;
(c) applying the liquid fabric treatment composition to the substrate;
(d) placing damp clothing containing water into the interior of the clothes dryer;
(e) placing the substrate into the interior of the clothes dryer, the liquid fabric treatment composition applied to the substrate being in liquid form when the substrate is placed into the interior of the clothes dryer;
(f) tumbling the damp clothing and the substrate within the interior of the clothes dryer, the damp clothing and the substrate not being enclosed together within a bag or other container during the course of a drying cycle while the damp clothing is being dried; and
(g) transferring an effective amount of the at least one active ingredient from the substrate substantially evenly throughout the damp clothing during the course of a drying cycle, prior to heating the damp clothing to a temperature necessary to remove water from the damp clothing, as a result of contact of the liquid fabric treatment composition carried by the substrate with the water contained within the damp clothing such that the damp clothing is treated by the at least one active ingredient.

16. The method of claim 15 in which step (a) comprises providing a substrate which is a blend of absorbent and adsorbent non-woven materials.

17. The method of claim 15 in which step (b) comprises providing a substantially non-ionic liquid fabric treatment composition having at least one active ingredient chosen from the group consisting of anti-creasing agents, anti-soil agents, bacteriostatic agents, brightening agents, bodying agents, softening agents, dyes, fiber emollients, finishing agents, inset repellants, germicides, lubricants, mildew-proofing agents, moth-proofing agents, shrinkage controllers and sizing agents.

18. The method of claim 15, in which step (b) comprises providing a substantially non-ionic liquid fabric treatment composition having auxiliaries and additives chosen from the group consisting of preservatives and fragrances.

19. The method of claim 15 in which step (g) comprises transferring an effective amount of the at least one active ingredient from the substrate to the damp clothing during an initial stage of a drying cycle beginning when the damp clothing has its greatest water content and prior to heating the damp clothing to a temperature necessary to remove Water from the damp clothing.

20. A method of treating fabric in a clothes dryer, comprising:
(a) providing a nonwoven substrate;
(b) providing a substantially non-ionic liquid fabric treatment composition having at least one active ingredient;
applying the liquid fabric treatment composition to the substrate;
(d) placing damp clothing containing water into the interior of the clothes dryer;
(e) placing the substrate into the interior of the clothes dryer, the liquid fabric treatment composition applied to the substrate being in liquid form when the substrate is placed into the interior of the clothes dryer;
(f) tumbling the damp clothing and the substrate within the interior of the clothes dryer, the damp clothing and the substrate not being enclosed together within a bag or other container during the course of a drying cycle while the damp clothing is being dried; and
(g) transferring an effective amount of the at least one active ingredient from the substrate substantially evenly throughout the damp clothing during an initial stage of a drying cycle beginning when the damp clothing has its greatest water content and prior to heating the damp clothing to a temperature necessary to remove water from the damp clothing as a result of contact of the liquid fabric treatment composition carried by the substrate with the water contained within the damp clothing such that the damp clothing is treated by the at least one active ingredient.

21. The method of claim 20 in which step (a) comprises providing a substrate which is a blend of absorbent and adsorbent non-woven materials.

22. The method of claim 20 in which step (b) comprises providing a substantially non-ionic liquid fabric treatment composition having at least one active ingredient chosen from the group consisting of anti-creasing agents, anti-soil agents, bacteriostatic agents, brightening agents, bodying agents, softening agents, dyes, fiber emollients, finishing agents, inset repellants, germicides, lubricants, mildew-proofing agents, moth-proofing agents, shrinkage controllers and sizing agents.

23. The method of claim 20 in which step (b) comprises providing a substantially non-ionic liquid fabric treatment composition having auxiliaries and additives chosen from the group consisting of preservatives and fragrances.

24. A method of treating fabric in a clothes dryer, comprising:
(a) providing a nonwoven substrate;
(b) providing a substantially non-ionic liquid fabric treatment composition having at least one active ingredient;
(c) applying the liquid fabric treatment composition to the substrate;
(d) placing damp clothing containing water into the interior of the clothes dryer;
(e) placing the substrate into the interior of the clothes dryer, the liquid fabric treatment composition applied to the substrate being in liquid form when the substrate is placed into the interior of the clothes dryer;
(f) tumbling the damp clothing and the substrate within the interior of the clothes dryer, the damp clothing and the substrate not being enclosed together within a bag or other container during the course of a drying cycle while the damp clothing is being dried; and
(g) transferring an effective amount of the at least one active ingredient from the substrate substantially evenly throughout the damp clothing during the course of the drying cycle as a result of contact of the liquid fabric treatment composition carried by the substrate with the water contained within the damp clothing.

25. The method of claim 24 in which step (a) comprises providing a substrate which is a blend of absorbent and adsorbent non-woven materials.

26. The method of claim 24 in which step (b) comprises providing a substantially non-ionic liquid fabric treatment composition having at least one active ingredient chosen from the group consisting of anti-creasing agents, anti-soil agents, bacteriostatic agents, brightening agents, bodying agents, softening agents, dyes, fiber emollients, finishing agents, inset repellants, germicides, lubricants, mildew-proofing agents, moth-proofing agents, shrinkage controllers and sizing agents.

27. The method of claim 24 in which step (b) comprises providing a substantially non-ionic liquid fabric treatment composition having auxiliaries and additives chosen from the group consisting of preservatives and fragrances.

28. The method of claim 24 in which step (g) comprises transferring an effective amount of the at least one active ingredient from the substrate to the damp-clothing during an initial stage of a drying cycle beginning when the damp clothing has its greatest water content.

29. The method of claim 24 in which step (g) comprises transferring an effective amount of the at least one active, ingredient from the substrate to the damp clothing during the course of a drying cycle prior to heating the damp clothing to a temperature necessary to remove water from the damp clothing.

30. The method of claim 24 in which step (g) comprises transferring an effective amount of the at least one active ingredient from the substrate to the damp clothing during an initial stage of a drying cycle beginning when the damp clothing has its greatest water content and prior to heating the damp clothing to a temperature necessary to remove water from the damp clothing.

31. The method of claim 24 in which step (c) comprises applying the liquid fabric treatment composition at substantially ambient temperature to the substrate.

32. The method of claim 24 in which step (c) comprises applying the liquid fabric treatment composition to the substrate with the substrate at substantially ambient temperature.

* * * * *